United States Patent
Tanaka (10) Patent No.: US 10,914,876 B2
(45) Date of Patent: Feb. 9, 2021

(54) LIGHT SOURCE DEVICE AND PROJECTION DISPLAY APPARATUS

(71) Applicant: Panasonic Intellectual Property Management Co., Ltd., Osaka (JP)

(72) Inventor: Takaaki Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 258 days.

(21) Appl. No.: 16/052,158

(22) Filed: Aug. 1, 2018

(65) Prior Publication Data

US 2019/0064400 A1 Feb. 28, 2019

(30) Foreign Application Priority Data

Aug. 23, 2017 (JP) ................. 2017-160243
Jun. 1, 2018 (JP) ................. 2018-105738

(51) Int. Cl.
*G02B 5/02* (2006.01)
*G02B 13/20* (2006.01)
(Continued)

(52) U.S. Cl.
CPC ......... *G02B 5/0236* (2013.01); *G02B 5/0278* (2013.01); *G02B 27/0933* (2013.01);
(Continued)

(58) Field of Classification Search
CPC .. G02B 5/0242; G02B 5/0278; G02B 5/0236; G02B 5/0268; G02B 5/0221; G02B 5/02; G02B 5/021; G02B 5/0226; G02B 5/0284; G02B 6/0051; H01L 51/5268; H01L 51/5275; H01L 2924/00; H01L 51/56; G02F 1/133504; G02F 1/133502; G02F 1/133524; G02F 1/133606; G02F 1/13338; G02F 1/133512; G02F 2001/133607; G02F 2201/38
(Continued)

(56) References Cited

U.S. PATENT DOCUMENTS 5,313,479 A 5/1994 Florence
8,894,213 B2 * 11/2014 Sugiyama ............ H04N 9/3161
353/31
(Continued)

FOREIGN PATENT DOCUMENTS

JP 6-208089 7/1994
JP 3174810 U 4/2012
(Continued)

*Primary Examiner* — William R Alexander
*Assistant Examiner* — Tamara Y. Washington
(74) *Attorney, Agent, or Firm* — Wenderoth, Lind & Ponack, L.L.P.

(57) ABSTRACT

The light source device of the projection display apparatus according to the present disclosure includes: solid-state light sources that individually emit blue light, green light, and red light; a plurality of dichroic mirrors that combine the blue light, the green light, and the red light having exited from the solid-state light sources; a first diffusion plate on which the combined light having been combined by the plurality of dichroic mirrors is incident; a dynamic diffusion plate that is disposed at a position at which the combined light having exited from the first diffusion plate converges and starts to diverge.

13 Claims, 5 Drawing Sheets

(51) Int. Cl.
- *H04N 9/31* (2006.01)
- *G02B 27/48* (2006.01)
- *G03B 27/48* (2006.01)
- *G03B 21/20* (2006.01)
- *G02B 27/10* (2006.01)
- *G02B 27/09* (2006.01)
- *G03B 33/06* (2006.01)

(52) U.S. Cl.
CPC ........... *G02B 27/102* (2013.01); *G02B 27/48* (2013.01); *G03B 21/208* (2013.01); *G03B 21/2013* (2013.01); *G03B 21/2033* (2013.01); *G03B 21/2073* (2013.01); *G03B 27/48* (2013.01); *G03B 33/06* (2013.01); *H04N 9/3161* (2013.01); *H04N 9/3164* (2013.01)

(58) Field of Classification Search
USPC .......................................................... 359/599
See application file for complete search history.

(56) References Cited

U.S. PATENT DOCUMENTS

| | | | |
|---|---|---|---|
| 2009/0310087 A1 | 12/2009 | Itoh et al. | |
| 2017/0299958 A1* | 10/2017 | Kawasumi | G03B 21/005 |
| 2018/0217486 A1* | 8/2018 | Tanaka | G03B 21/204 |
| 2019/0235369 A1* | 8/2019 | Janssens | G03B 21/005 |

FOREIGN PATENT DOCUMENTS

| | | |
|---|---|---|
| JP | 2012-145804 | 8/2012 |
| JP | 2015-161801 | 9/2015 |
| WO | 2007/116935 | 10/2007 |

\* cited by examiner

LIGHT SOURCE DEVICE AND PROJECTION DISPLAY APPARATUS

BACKGROUND

1. Technical Field

The present disclosure relates to projection display apparatuses each of which enlarges and projects images onto a screen by using a projection lens, with such images being formed by image forming elements that are irradiated with illumination light.

2. Description of the Related Art

Many types of light source devices have been disclosed which are to be used as light sources for projection display apparatuses that employ mirror-deflection digital micromirror devices (DMDs) or light valves using liquid crystal panels. Such light source devices use solid-state light sources featuring long service life, such as semiconductor lasers and light-emitting diodes. Among them, a light source device featuring a wide color gamut and high efficiency has been disclosed which uses a blue, a green, and a red solid-state light source.

When an image is formed on a screen, use of laser light being highly coherent will cause speckle noises. A technology for eliminating such speckle noises by using a rotatable diffusion plate is disclosed in Japanese Patent Unexamined Publication No. H06-208089 (Patent Literature 1). Moreover, International Publication WO 2007/116935 (Patent Literature 2) discloses another configuration, as a means of eliminating such speckle noises, which uses a plurality of polymer dispersion panels that can change a plurality of degrees of diffusion.

SUMMARY

The present disclosure is intended to provide a light source device and a projection display apparatus, which each achieve a small size, a wide color gamut, and high luminance while eliminating speckle noises and fine unevenness in luminance.

The light source device of the projection display apparatus according to the present disclosure includes: solid-state light sources that individually emit blue light, green light, and red light; a plurality of dichroic mirrors that combine the blue light, the green light, and the red light having exited from the solid-state light sources; a first diffusion plate on which the combined light having been combined by the plurality of dichroic mirrors is incident; a dynamic diffusion plate that is disposed at a position at which the combined light having exited from the first diffusion plate converges and starts to diverge.

In accordance with the present disclosure, it is possible to configure the light source device that features a small size, a wide color gamut, and high luminance while eliminating speckle noises and fine unevenness in luminance, through the use of: the solid-state light sources for emitting the blue, the green, and the red light; the small-size dichroic mirror for combining the light, being convergent light, which has exited from the solid-state light sources; the dynamic diffusion plate; and the first diffusion plate disposed anterior to the dynamic diffusion plate. This, in turn, allows the implementation of the projection display apparatus that features a small size, a wide color gamut, and high luminance.

DETAILED DESCRIPTION OF THE PREFERRED EMBODIMENT

Hereinafter, preferred embodiments will be described with reference to the accompanying drawings.

First Exemplary Embodiment

Figure 1:
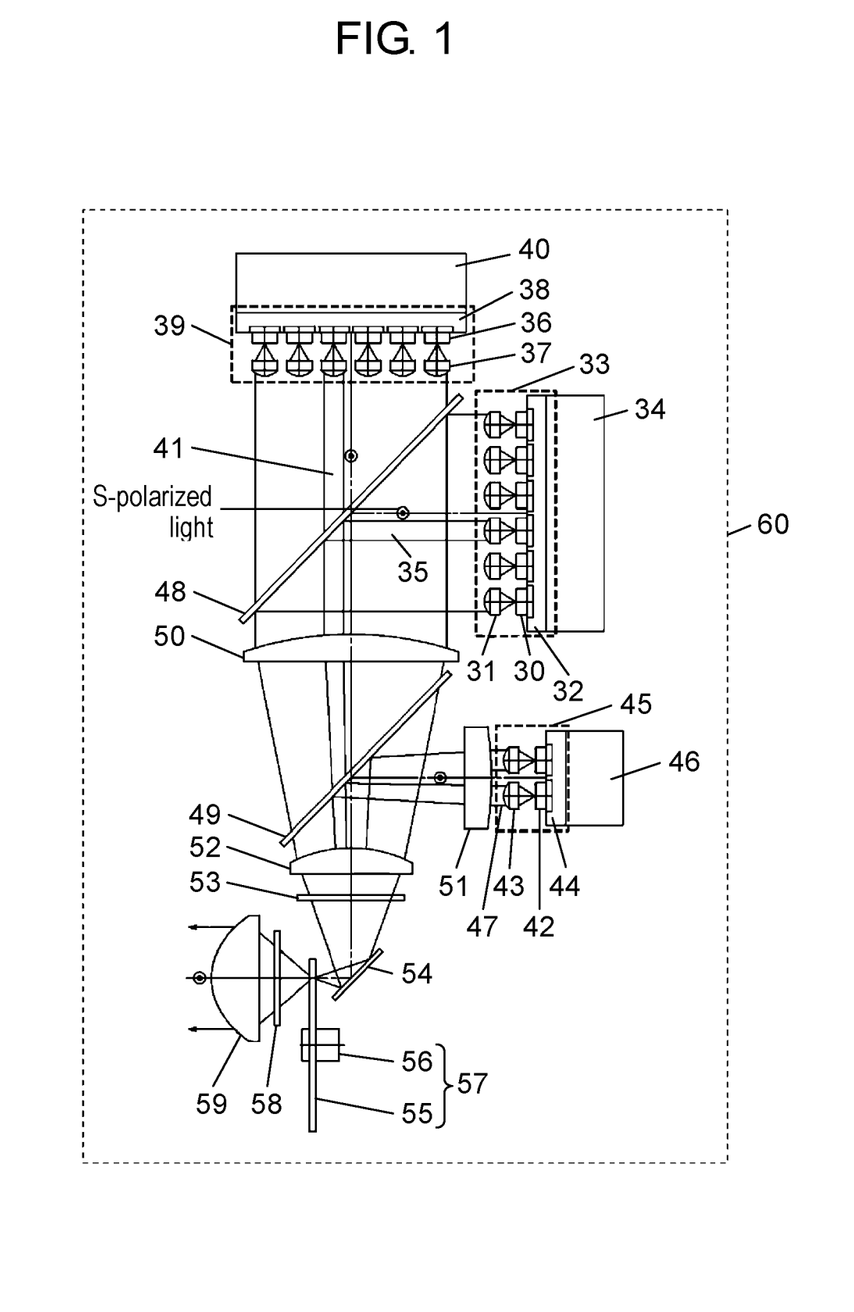
FIG. 1 is a view of a configuration of a light source device according to a first embodiment.

FIG. 1 is a view of a configuration of light source device 60 according to a first embodiment.

Red laser light source 33 is configured with: red semiconductor lasers 30 being red solid-state light sources; collimator lenses 31; and heat dissipation plate 32. Green laser light source 39 is configured with: green semiconductor lasers 36 being green solid-state light sources; collimator lenses 37; and heat dissipation plate 38. Blue laser light source 45 is configured with: blue semiconductor lasers 42 being blue solid-state light sources; collimator lenses 43 and heat dissipation plate 44.

Moreover, light source device 60 includes: heat sinks 34, 40, and 46; red-reflection dichroic mirror 48; blue-reflection dichroic mirror 49; condenser lenses 50, 51, 52, and 59; diffusion plates 53 and 58; rotary diffusion plate 57 which is a dynamic diffusion plate and is configured with circular diffusion plate 55 and motor 56; and reflection mirror 54. FIG. 1 shows an aspect of each of luminous fluxes 35, 41, and 47, which exit from the semiconductor laser light sources, and shows polarization directions of the light entering/exiting from red-reflection dichroic mirror 48 and blue-reflection dichroic mirror 49. Diffusion plate 53 corresponds to a first diffusion plate; diffusion plate 58 corresponds to a second diffusion plate.

Red laser light source 33 is configured including: 24 units (6×4) of red semiconductor lasers 30 arrayed in a square arrangement, and collimator lenses 31. These semiconductor lasers and collimator lenses are disposed two-dimensionally at regular intervals on heat dissipation plate 32. Each of red semiconductor lasers 30 emits red light in a wavelength width from 632 nm to 648 nm, thereby causing linearly-polarized light to exit from it. The red light having exited from red semiconductor laser 30 is condensed by a corresponding one of collimator lenses 31, thereby being converted into collimated luminous flux 35. A group of luminous fluxes 35 enter red-reflection dichroic mirror 48 to be reflected off it. Heat sink 34 is intended to cool red laser light source 33.

Green laser light source 39 is configured including: 24 units (6×4) of green semiconductor lasers 36 arrayed in a square arrangement, and collimator lenses 37. These semiconductor lasers and collimator lenses are disposed two-dimensionally at regular intervals on heat dissipation plate 38. Each of green semiconductor lasers 36 emits green light in a wavelength width from 517 nm to 533 nm, thereby causing linearly-polarized light to exit from it. The green light having exited from green semiconductor laser 36 is condensed by a corresponding one of collimator lenses 37, thereby being converted into a corresponding one of collimated luminous fluxes 41. A group of luminous fluxes 41 enter red-reflection dichroic mirror 48 to pass through it. The semiconductor lasers for emitting the color light are disposed such that the polarized light exiting from each of green semiconductor laser 36 and red semiconductor laser 30 is S-polarized light with respect to the plane of incidence of red-reflection dichroic mirror 48. Heat sink 40 is intended to cool green laser light source 39.

Blue laser light source 45 is configured including: eight (8) units (2×4) of blue semiconductor lasers 42 arrayed in a square arrangement, and collimator lenses 43. These semiconductor lasers and collimator lenses are disposed two-dimensionally at regular intervals on heat dissipation plate 44. The number of blue semiconductor lasers 42 that configure such a blue laser light source is not larger than one-third (⅓) each of the numbers of the red and green semiconductor lasers. This is because each of the blue semiconductor lasers has high light output and luminous efficiency, on a single laser-element basis, compared to each of the red and the green semiconductor lasers, and because the light output required for achieving a desired white-light chromaticity is small.

Blue semiconductor lasers 42 are disposed such that the polarized light exiting from the blue semiconductor lasers is S-polarized light with respect to the plane of incidence of blue-reflection dichroic mirror 49. Heat sink 46 is intended to cool blue laser light source 45.

Each of blue semiconductor lasers 42 emits blue light in a wavelength width from 447 nm to 462 nm, thereby causing linearly-polarized light to exit from it. The light having exited from blue semiconductor laser 42 is condensed by a corresponding one of collimator lenses 43, thereby being converted into a corresponding one of collimated luminous fluxes 47. A group of luminous fluxes 47 enter condenser lens 51.

The red laser light and the green laser light are combined by red-reflection dichroic mirror 48 to enter condenser lens 50. Condenser lens 50 converts the incident collimated light into convergent light with a converging angle of approximately ±12 degrees. The light having passed through condenser lens 50 then enters blue-reflection dichroic mirror 49 to pass through it. On the other hand, the blue laser light is converted into convergent light by condenser lens 51 and then enters blue-reflection dichroic mirror 49 to be reflected off it.

Figure 2:
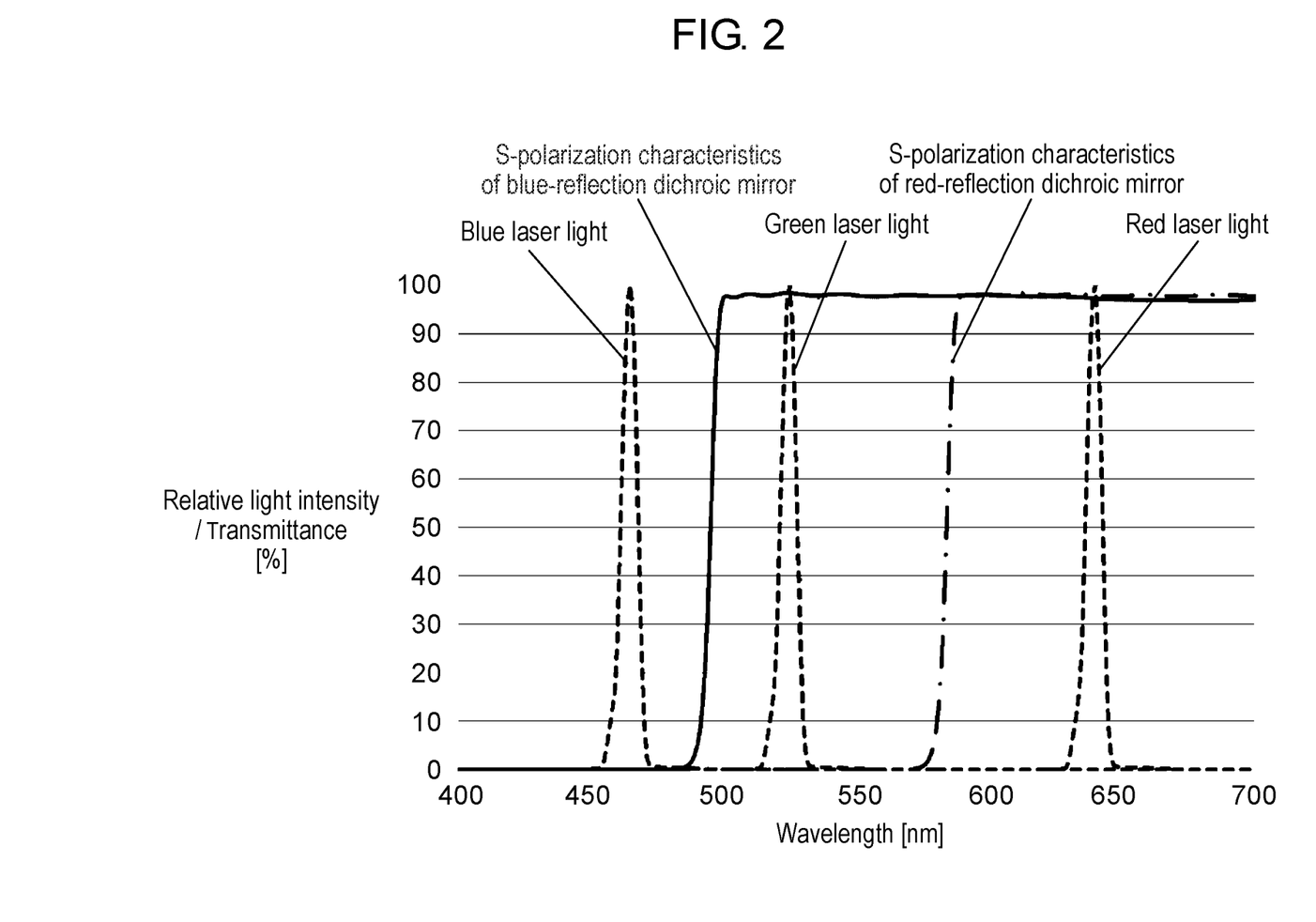
FIG. 2 is a view showing spectral characteristics of a dichroic mirror and spectral characteristics of light sources, according to the first embodiment.

FIG. 2 shows spectral transmittance characteristics of the red-reflection dichroic mirror and spectral transmittance characteristics of the blue-reflection dichroic mirror. FIG. 2 also shows relative intensity spectra of the blue, the green, and the red laser light.

Red-reflection dichroic mirror 48 has characteristics in which, at the incident angle of 45 degrees, it transmits not smaller than 96% of the green laser light and reflects not smaller than 98% of the red laser light. The half-value wavelength with which the red-reflection dichroic mirror's transmittance is 50% is set equal to 583 nm that is an intermediate wavelength between the dominant wavelength of 525 nm of the green laser light and the dominant wavelength of 640 nm of the red laser light.

Blue-reflection dichroic mirror 49 has characteristics in which, at the incident angle of 45 degrees, it transmits not smaller than 96% of the red and the green laser light and reflects not smaller than 98% of the blue laser light. The half-value wavelength with which the blue-reflection dichroic mirror's transmittance is 50% is set equal to 495 nm that is an intermediate wavelength between the dominant wavelength of 465 nm of the blue laser light and the dominant wavelength of 525 nm of the green laser light.

The incident angles of the red and the green laser light on the red-reflection dichroic mirror are each 45 degrees. On the other hand, the blue laser light having been converted into the convergent light enters the blue-reflection dichroic mirror at the incident angle of 45 degrees±12 degrees.

For this reason, the spectral transmittance characteristics of blue-reflection dichroic mirror 49 are subjected to a wavelength shift ranging from about −20 nm to about +20 nm, in accordance with the incident angle. However, the difference between the dominant wavelength of the blue laser light and the dominant wavelength of the green laser light is 60 nm, resulting in no decrease in transmittance and reflectance characteristics for any of the blue and the green laser light.

In cases where change of the incident angle to the blue-reflection dichroic mirror becomes further large enough to cause a decrease in the transmittance and reflectance for the blue and the green laser light, a film-thickness-distributed dichroic mirror is used which has a constant half-value wavelength independent of the changing of the incident angle.

The laser light having passed through blue-reflection dichroic mirror 49 and the laser light having been reflected off the blue-reflection dichroic mirror, enter condenser lens 52. Condenser lens 52 has a lens shape that is determined such that the condenser lens can converge, in combination with a corresponding one of condenser lenses 50 and 51, each of the laser light fluxes in the vicinity of rotary diffusion plate 57. The laser light passes through condenser lens 52, is diffused by diffusion plate 53, is reflected off reflection mirror 54, and then enters rotary diffusion plate 57. Diffusion plate 53 is configured including a diffusion surface that is composed of fine microlenses formed in an array on a glass substrate. Such a diffusion plate can diffuse the light incident thereon. The application of the fine microlens structures to the diffusion surface allows a decrease in the maximum spread angle of the light, compared to chemically-processed diffusion plates with fine concave-and-convex structures that are formed in the surfaces of glass plates by using a solution such as hydrofluoric acid. The decrease in the maximum spread angle leads, in turn, to a decrease in the divergence loss of the light. The diffusion angle defined as a half-value angle width at which the diffused light decreases in intensity to 50% of its maximum, is approximately six (6) degrees which is so small that the polarization characteristics are held. Here, it is assumed that the term "spot diameter" of a spot light is defined as its diameter with which the spot light's intensity is 13.5% of its peak intensity. The diffused light fluxes are superimposed on one another to form a spot light with a spot diameter ranging from 3 mm to 5 mm which enters rotary diffusion plate 57. Diffusion plate 53 diffuses the light such that the spot diameter of the spot light becomes equal to a desired spot diameter.

Figure 3:
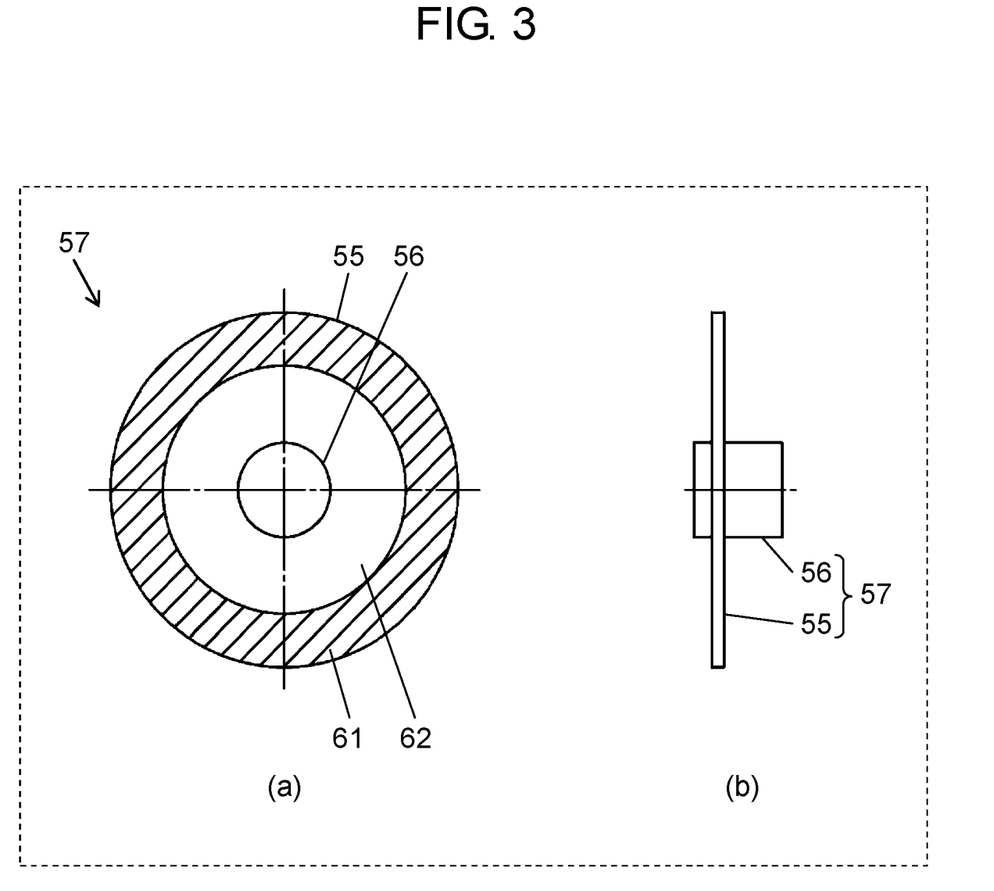
FIG. 3 is a view of a configuration of a rotary diffusion plate according to the first embodiment.

FIG. 3 shows a configuration of the rotary diffusion plate. Part (a) of FIG. 3 is a plan view; part (b) of FIG. 3 is a side-elevational view. Circular diffusion plate 55 is provided with smooth-surface region 62 serving as a high-adhesion joining surface with motor 56.

Rotary diffusion plate 57 is provided with: motor 56 disposed at a center portion, and circular diffusion plate 55 having diffusion region 61 which is configured by forming fine concave-and-convex structures in the surface of a glass substrate in an annular-ring shape. Rotation of the rotary diffusion plate can be controlled. Rotary diffusion plate 57 is a diffusion plate capable of rotating at a high speed up to about 10800 rpm.

The diffusion region of the diffusion plate is composed of a chemically-processed diffusion plate offering a diffusion angle of approximately 12 degrees which allows the polarization characteristics to be held. Chemical formation of the diffusion regions on both sides of the diffusion plate is also possible. The diffusion plate with such both-sided diffusion regions can offer a larger diffusion angle than microlens-array diffusion plates. In addition, it is possible to configure a large-size diffusion plate at a relatively low cost. Although the chemically-processed diffusion plate offers an increased maximum spread angle, condenser lens 59 can efficiently converge such a spreading light. The rotation of the diffusion surface brings about high-speed, temporal-and-spatial variations in random interference patterns that are caused by the laser light on a screen, which allows elimination of speckle noises. Moreover, the use of diffusion plate 53 and rotary diffusion plate 57 can also reduce fine unevenness in luminance that is attributed to the number and sizes of fine light emission sites of the laser light sources.

Thus, the light diffused by rotary diffusion plate 57 turns into light, the speckle noises of which have been almost eliminated; the speckle noises are attributed to properties of the laser light. Then, the light starts to diverge from rotary diffusion plate 57, and enters diffusion plate 58. Diffusion plate 58 is a diffusion plate with a microlens array formed on a glass substrate, with the plate offering a diffusion angle of approximately six (6) degrees which allows the polarization characteristics to be held. Diffusion plate 58 further diffuses the light, which thereby further reduces the unevenness in luminance that is attributed to the number and sizes of fine light emission sites of the laser light sources. Each of diffusion plate 53, rotary diffusion plate 57, and diffusion plate 58 is disposed at a position where the light becomes a corresponding one of convergent light and divergent light. Their arrangements at such respective positions, i.e. either the convergent-light position or the divergent-light position, allow condenser lens 59 to efficiently converge the light even when the light has been spread. Moreover, this allows a compact arrangement of diffusion plate 53, rotary diffusion plate 57, and diffusion plate 58, which results in the implementation of the configuration of the low-cost, compact light source device. The light having passed through diffusion plate 58 is converged by condenser lens 59 into substantially collimated light.

Condenser lens 59 has a lens shape that is determined such that the condenser lens causes the spot light in the vicinity of rotary diffusion plate 57 to become collimated light. The optical elements from the red, the green, and the blue laser light source to condenser lens 59 maintain the polarization characteristics of the light; therefore, the light exiting from condenser lens 59 is S-polarized light.

The positions of the green laser light source and the red laser light source may be exchanged, with red-reflection dichroic mirror 48 being replaced by a green-reflection dichroic mirror.

The description has been made regarding the configuration in which the collimated light enters red-reflection dichroic mirror 48; however, the configuration may be as follows: Condenser lenses are disposed such that the light having exited from each of the red and the green laser light source is converged by a corresponding one of the condenser lenses to form convergent light which, in turn, enters a red-reflection dichroic mirror. Such a red-reflection dichroic mirror can be downsized.

The description has been made regarding the configuration in which diffusion plates 53 and 58 are each the diffusion plate with a microlens array; however, the following substitutes for them may be used. That is, chemically-processed diffusion plates are used which show a slightly lower light-converging efficiency but feature a low cost.

The description has been made regarding the configuration in which circular diffusion plate 55 of rotary diffusion plate 57 is the chemically-processed diffusion plate; however, the circular diffusion plate may be a diffusion plate with a microlens array, although it is expensive. Rotary diffusion plate 57 may be another dynamic diffusion plate which does not rotate, but rocks or vibrates.

The configuration may be such that rotary diffusion plate 57 is a low-speed, rotatable one, with the diffusion plates and the reflection mirror being each provided with a mechanism for rocking or vibrating to reduce speckle noises. Reflection mirror 54 may be a multiple reflection mirror with a front-surface reflectance of 30% and a rear-surface reflectance of 100%, which thereby increases the amount of luminous fluxes of the laser light, leading to reduced unevenness in luminance attributed to the laser light.

The description has been made regarding the configuration in which the laser light sources are composed as follows: The red, the green, and the blue laser light source are composed of 24 units, 24 units, and eight (8) units of the corresponding semiconductor laser elements, respectively. The further-increased number of the semiconductor laser elements may be used to configure the laser light sources, for achieving increased luminance.

As described above, the light source device according to the present disclosure is configured including: the dichroic mirror on which the convergent light is incident from the red, the green, and the blue laser light source; and a plurality of the diffusion plates on which either the convergent or the divergent light is incident, thereby allowing the configuration of the small-size light source device. Moreover, the use of the rotary diffusion plate and the first diffusion plate which is disposed anterior to the rotary diffusion plate, makes it possible to eliminate speckle noises and unevenness in luminance which are attributed inherently to the laser light. This allows the light source device according to the present disclosure to be made in a small size, and to be capable of providing white light with a wide color gamut.

Second Exemplary Embodiment

Figure 4:
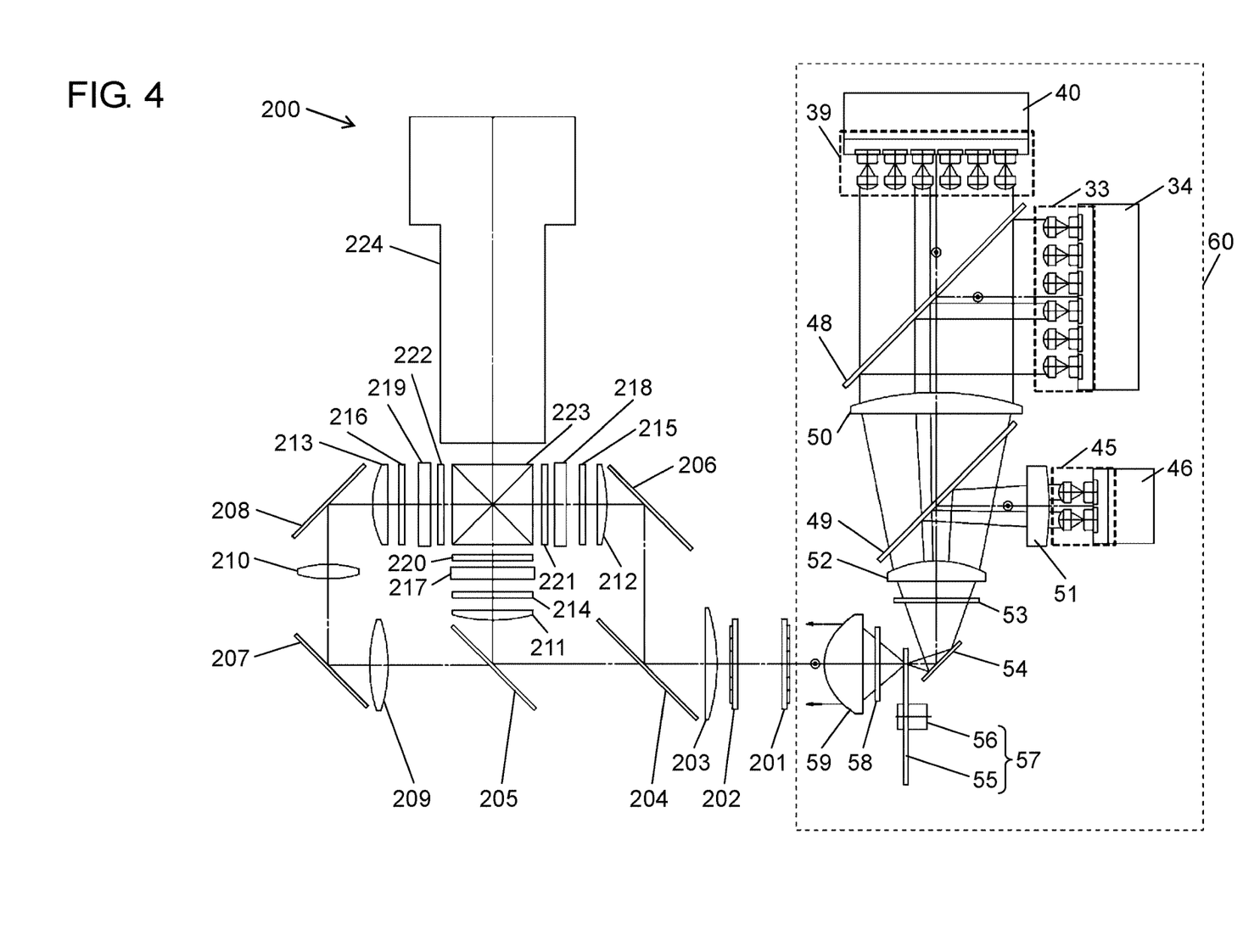
FIG. 4 is a view of a configuration of a projection display apparatus according to a second embodiment.

FIG. 4 is a view of a first projection display apparatus according to a second embodiment of the present disclosure.

First projection display apparatus 200 includes image forming elements each of which employs an active-matrix, transmissive liquid crystal panel, either a twisted nematic (TN) mode or a vertical alignment (VA) mode. The pixel region of the panel is provided with thin-film transistors.

Light source device 60 of first projection display apparatus 200 is configured including: red laser light source 33, green laser light source 39, blue laser light source 45, heat sinks 34, 40, and 46, red-reflection dichroic mirror 48, blue-reflection dichroic mirror 49, condenser lenses 50, 51, and 52, diffusion plate 53, reflection mirror 54, rotary diffusion plate 57 configured with circular diffusion plate 55 and motor 56, diffusion plate 58, and condenser lens 59. The light source device described above is the same as that described in the first embodiment of the present disclosure.

Moreover, first projection display apparatus 200 includes: first lens array plate 201, second lens array plate 202, superimposing lens 203, blue-reflection dichroic mirror 204, green-reflection dichroic mirror 205, reflection mirrors 206, 207, and 208, relay lenses 209 and 210, field lenses 211, 212, and 213, incidence-side polarizing plates 214, 215, and 216, liquid crystal panels 217, 218, and 219, exiting-side polarizing plates 220, 221, and 222, color combining prism 223 configured with a red-reflection dichroic mirror and a blue-reflection dichroic mirror, and projection lens 224.

White light coming from light source device 60 enters first lens array plate 201 that is configured with a plurality of lens elements. A luminous flux incident on first lens array plate 201 is divided into a large number of luminous fluxes. The large numbers of the divided luminous fluxes converge onto second lens array plate 202 that is configured with a plurality of lens elements. The lens elements of first lens array plate 201 are similar in opening shape to liquid crystal panels 217, 218, and 219. The lens elements of second lens array plate 202 have a focal length which is determined such that first lens array plate 201 and liquid crystal panels 217, 218, and 219 are substantially in a conjugate relation. The light having exited from second lens array plate 202 enters superimposing lens 203. Superimposing lens 203 is a lens intended to superimpose the light, which has exited from each of the lens elements of second lens array plate 202, onto liquid crystal panels 217, 218, and 219 to illuminate them. First and second lens array plates 201 and 202 and superimposing lens 203 configure an illumination optical system.

The light having come from superimposing lens 203 is separated into blue, green, and red light by blue-reflection dichroic mirror 204 and green-reflection dichroic mirror 205 which are means of color separation. The green light passes through field lens 211 and incidence-side polarizing plate 214, and then enters liquid crystal panel 217. The blue light is reflected off reflection mirror 206, passes through field lens 212 and incidence-side polarizing plate 215, and then enters liquid crystal panel 218. The red light passes through relay lens 209, is reflected off reflection mirror 207, passes through relay lens 210, is reflected off reflection mirror 208, passes through field lens 213 and incidence-side polarizing plate 216, and then enters liquid crystal panel 219. In this way, the light having come from light source device 60 is caused to converge by the illumination optical system, to illuminate the liquid crystal panels, i.e. to-be-illuminated regions.

Three liquid crystal panels 217, 218, and 219 form a green, a blue, and a red image, respectively, in the following manner. That is, each of the liquid crystal panels 217, 218, and 219 changes polarization states of the corresponding incident light by controlling voltages applied to its pixels that are individually specified in accordance with an image signal. The light with the thus-changed polarization states is modulated to form an image of the corresponding color, through use of a corresponding one of the combinations of incidence-side polarizing plates 214, 215, and 216 and, respectively, exiting-side polarizing plates 220, 221, and 222. Each of the combinations is configured as follows: Each of the incidence-side polarizing plates and the corresponding exiting-side polarizing plate are disposed on both sides of the corresponding liquid crystal panel, on an each-for-each side basis, such that the transmission axis of the incidence-side polarizing plate concerned is orthogonal to the transmission axis of the corresponding exiting-side polarizing plate.

The fluxes of the color light having passed through respective exiting-side polarizing plates 220, 221, and 222 are combined by color combining prism 223 in the following manner. That is, of the color light, the red and the blue light are respectively reflected off a red-reflection dichroic mirror and blue-reflection dichroic mirror of the prism, and are then combined together with the green light. Then, the thus-combined light enters projection lens 224. The light having entered projection lens 224 is then enlarged and projected onto a screen (not shown).

In cases where light coming from a light source device that uses a solid-state light source is unpolarized light, a projection display apparatus has conventionally been configured using polarization conversion elements. Fortunately, in the present disclosure, the light exiting from the light source device is the S-polarized light, which allows elimination of the need for such polarization conversion elements. This allows an improvement in the light-converging efficiency of the projection display apparatus, and a reduction in its cost.

The light source device is configured in a small size using the red, the green, and the blue laser light source, and is capable of emitting white light that features high color purity of three primary colors. This makes it possible to implement the projection display apparatus featuring a small-size and a wide color gamut. Moreover, the means of forming images is performed not through time sharing, but through use of the three liquid crystal panels that utilize polarization. This allows formation of projection images featuring no color breaking phenomenon, high luminance, favorable color reproduction, and high definition. Furthermore, compared to cases where three DMDs are used, the projection display apparatus described above can be configured in a small size because it does not use any total internal reflection prism but uses the color combining prism being a small-size 45-degree-incidence prism.

As described above, the first projection display apparatus according to the present disclosure uses the light source device that includes: the red, the blue, and the green laser light source, the small-size dichroic mirrors that combine the color light fluxes coming from the laser light sources, the rotary diffusion plate, and the first diffusion plate disposed anterior to the rotary diffusion plate. This allows the configuration of the projection display apparatus featuring a small size, a wide color gamut, reduced speckle noises, and reduced unevenness in luminance.

The first projection display apparatus is configured using the transmissive liquid crystal panels as the image forming elements; however, reflective liquid crystal panels may be used as the image forming elements. Use of the reflective liquid crystal panel allows configuration of the projection display apparatus that features a smaller size and high definition.

Third Exemplary Embodiment

Figure 5:
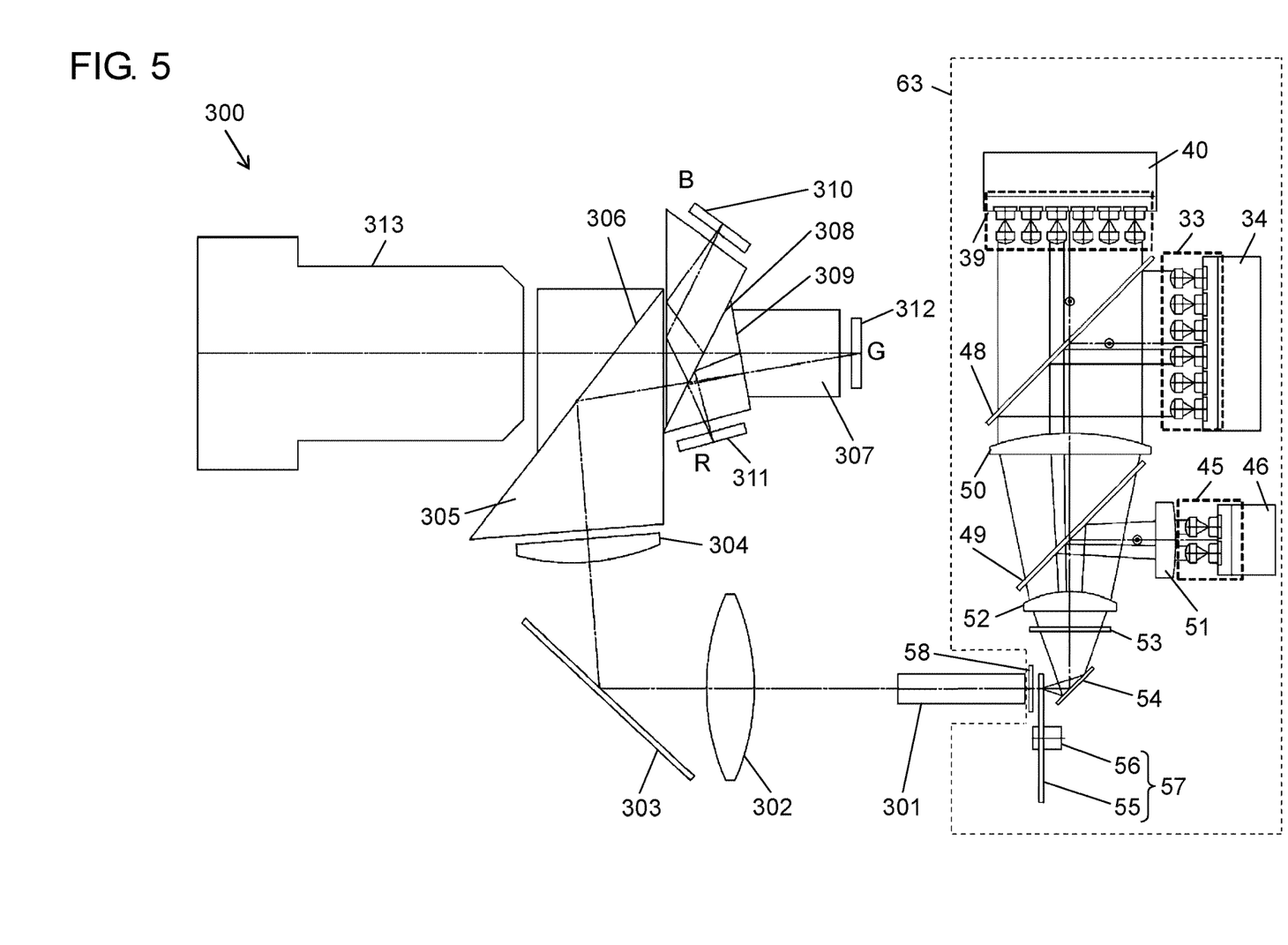
FIG. 5 is a view of a configuration of a projection display apparatus according to a third embodiment.

FIG. 5 is a view of a second projection display apparatus according to a third embodiment of the present disclosure. The second projection display apparatus uses image forming elements that are three mirror-deflection DMDs.

Light source device 63 of second projection display apparatus 300 is configured with: red laser light source 33, green laser light source 39, blue laser light source 45, heat sinks 34, 40, and 46, red-reflection dichroic mirror 48, blue-reflection dichroic mirror 49, condenser lenses 50, 51, and 52, diffusion plate 53, reflection mirror 54, rotary diffusion plate 57 configured with circular diffusion plate 55 and motor 56, and diffusion plate 58. This light source device is different from the light source device according to the first embodiment of the present disclosure in that condenser lens 59 is not disposed.

White light having exited from light source device 63 is converged onto rod 301. The light incident on rod 301 is subjected to multiple-times reflection in the inside of the rod, thereby making the light intensity distribution uniform. The thus-uniformed light exits from the rod. The light having exited from rod 301 is converged by relay lens 302 and reflected off reflection mirror 303, and then passes through field lens 304 to enter total internal reflection prism 305.

Total internal reflection prism 305 is configured with two prisms. There exists thin air layer 306 between vicinal faces of the two prisms. Air layer 306 totally reflects light incident thereon at angles not smaller than a critical angle of total reflection. The light having come from field lens 304 is totally reflected off a total-reflection face of total internal reflection prism 305 to enter color prism 307.

Color prism 307 is configured with three prisms with vicinal faces between the three. On each of the vicinal faces, a corresponding one of blue-reflection dichroic mirror 308 and red-reflection dichroic mirror 309 is formed. Blue-reflection dichroic mirror 308 and red-reflection dichroic mirror 309 of color prism 107, separate the incident light into blue, red, and green light. Then, the separated light fluxes enter respective DMDs 310, 311, and 312. In this way, the illumination optical system configured with rod 301 causes the light having come from light source device 63 to illuminate to-be-illuminated regions in which micromirrors of the DMDs are arranged.

Each of DMDs 310, 311, and 312 deflects its micromirrors in accordance with an image signal, thereby reflecting the corresponding light to form an image as follows: That is, the DMD reflects a part of the incident light thereon to enter projection lens 313 and reflects the other part toward the outside of an effective area of projection lens 313. The light having been reflected off each of DMDs 310, 311, and 312 passes through color prism 307 again. In the course of passing through color prism 307, the blue, the red, and the green light which have been once separated are combined together, and then enters total internal reflection prism 305. The light having entered total internal reflection prism 305 passes through air layer 306 because of its incident angle not larger than the critical angle of total reflection, and then enters projection lens 313. In this way, the light of image formed by DMDs 310, 311, and 312 is enlarged and projected on a screen (not shown).

Although diffusion plate 58 is disposed between rotary diffusion plate 57 and rod 301, the diffusion plate may be disposed between relay lens 302 and rod 301 from which the divergent light exits to enter the diffusion plate.

The light exiting from the light source device is not required to be linearly-polarized light because of the use of the DMDs. In this case, the light exiting from each of the red, the green, and the blue laser light source may be either S-polarized light or P-polarized light. Moreover, the optical elements from the laser light sources to diffusion plate 58 are not required to hold the polarization characteristics of the light.

The light source device is configured in a small size by using the red, the green, and the blue laser light source and is capable of emitting white light that features high color purity of three primary colors. This makes it possible to implement the projection display apparatus featuring a small-size and a wide color gamut. The use of the DMDs as the image forming elements makes it possible to configure the projection display apparatus that features good resistance to light and heat, compared to image forming elements that use liquid crystal panels. Moreover, the use of the three DMDs makes it possible to achieve projection images with good color reproduction, high luminance, and high definition.

As described above, the second projection display apparatus according to the present disclosure uses the light source device that includes: the red, the blue, and the green laser light source, the small-size dichroic mirror that combines the color light fluxes coming from the laser light sources, the rotary diffusion plate, and the first diffusion plate disposed anterior to the rotary diffusion plate. This allows the configuration of the projection display apparatus featuring a small size, a wide color gamut, reduced speckle noises, and reduced unevenness in luminance.

Although the image forming element is configured with the three DMDs, it may be configured using one DMD. Use of the one DMD allows the configuration of a projection display apparatus featuring a smaller size and lower price.

INDUSTRIAL APPLICABILITY

The present disclosure relates to projection display apparatuses using image forming elements.

What is claimed is:

1. A light source device, comprising:
   solid-state light sources that individually emit blue light, green light, and red light;
   a plurality of dichroic mirrors that combine, into combined light, the blue light, the green light, and the red light having exited from the solid-state light sources;
   a first diffusion plate on which the combined light having been combined by the plurality of dichroic mirrors is incident;
   a dynamic diffusion plate that is disposed at a position at which the combined light having exited from the first diffusion plate converges and starts to diverge; and
   a second diffusion plate on which the combined light having exited from the dynamic diffusion plate is incident, the combined light being divergent light.

2. The light source device according to claim 1, wherein the plurality of dichroic mirrors is configured including:
   an either red-reflection or green-reflection dichroic mirror on which collimated light is incident; and
   a blue-reflection dichroic mirror on which convergent light is incident.

3. The light source device according to claim 2, wherein the blue-reflection dichroic mirror is a film-thickness-distributed dichroic mirror.

4. The light source device according to claim 1, wherein the dynamic diffusion plate is a rotary diffusion plate including:
   a circular diffusion plate that has a glass substrate with a surface in which a fine concave-and-convex structure is formed in an annular-ring shape; and
   a motor that rotates the circular diffusion plate.

5. The light source device according to claim 1, wherein the first diffusion plate is a diffusion plate having a glass substrate on which a microlens array is formed.

6. The light source device according to claim 1,
   wherein the solid-state light sources include a solid-state light source that emits the blue light; and
   the solid-state light source is a blue semiconductor laser.

7. The light source device according to claim 1,
   wherein the solid-state light sources include a solid-state light source that emits the green light; and
   the solid-state light source is a green semiconductor laser.

8. The light source device according to claim 1,
wherein the solid-state light sources include a solid-state light source that emits the red light; and
the solid-state light source is a red semiconductor laser.

9. The light source device according to claim 1, wherein the blue light, the green light, and the red light exiting from the solid-state light sources are each linearly-polarized light.

10. The light source device according to claim 1, wherein the combined light exiting from the dynamic diffusion plate is linearly-polarized light.

11. A projection display apparatus, comprising:
the light source device according to claim 1, the light source device emitting light;
an illumination optical system that converges the light having exited from the light source device;
an image forming element that is illuminated with the light having exited from the illumination optical system, and forms an image in accordance with an image signal; and
a projection lens that enlarges and projects the image formed by the image forming element.

12. The projection display apparatus according to claim 11, wherein the image forming element is a liquid crystal panel.

13. The projection display apparatus according to claim 11, wherein the image forming element is a mirror-deflection digital micromirror device.

\* \* \* \* \*